United States Patent
Jain

(10) Patent No.: US 8,205,430 B2
(45) Date of Patent: *Jun. 26, 2012

(54) VARIABLE GEOMETRY NACELLE ASSEMBLY FOR A GAS TURBINE ENGINE

(75) Inventor: Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/749,260

(22) Filed: May 16, 2007

(65) Prior Publication Data
US 2008/0286094 A1   Nov. 20, 2008

(51) Int. Cl.
*F02K 3/02* (2006.01)
(52) U.S. Cl. ............. 60/226.1; 137/15.1; 244/53 B
(58) Field of Classification Search ............ 137/15.1, 137/15.2; 60/226.2, 226.1, 230, 262; 239/265.29, 239/265.13, 265.25; 244/53 B, 110 B; 181/213, 181/214
See application file for complete search history.

(56) References Cited

U.S. PATENT DOCUMENTS

| | | | |
|---|---|---|---|
| 2,948,111 A * | 8/1960 | Nelson | 60/269 |
| 3,059,878 A * | 10/1962 | Kerry et al. | 244/23 B |
| 3,222,863 A | 12/1965 | Klees et al. | |
| 3,422,624 A * | 1/1969 | Geoffrey et al. | 60/226.1 |
| 3,524,611 A * | 8/1970 | Kurt | 244/53 B |
| 3,532,100 A * | 10/1970 | Geoffrey et al. | 137/15.1 |
| 3,541,794 A * | 11/1970 | Hans et al. | 60/226.2 |
| 3,568,694 A | 3/1971 | Johnson | |
| 3,575,259 A * | 4/1971 | Wilkinson | 181/214 |
| 3,611,724 A * | 10/1971 | Kutney | 60/226.1 |
| 3,618,699 A * | 11/1971 | Evans et al. | 181/214 |
| 3,623,328 A * | 11/1971 | Pike | 60/216 |
| 3,652,036 A * | 3/1972 | Sans et al. | 244/53 B |
| 3,662,556 A * | 5/1972 | Poucher et al. | 60/226.1 |
| 3,664,612 A | 5/1972 | Skidmore et al. | |
| 3,699,682 A * | 10/1972 | Kleckner | 60/226.2 |
| 3,736,750 A * | 6/1973 | Britt | 60/226.2 |
| 3,770,228 A * | 11/1973 | Traksel et al. | 244/53 B |
| 4,044,973 A | 8/1977 | Moorehead | |
| 4,083,181 A | 4/1978 | Adamson | |
| 4,147,029 A | 4/1979 | Sargisson | |
| 4,154,256 A * | 5/1979 | Miller | 137/15.1 |
| 4,220,171 A * | 9/1980 | Ruehr et al. | 137/15.1 |
| 4,722,357 A | 2/1988 | Wynosky | |
| 4,865,268 A | 9/1989 | Tracksdorf | |

(Continued)

FOREIGN PATENT DOCUMENTS

GB   1312619   4/1973

(Continued)

OTHER PUBLICATIONS

Extended European Search Report for Application No. 08252429.9 mailed Nov. 26, 2008.

(Continued)

*Primary Examiner* — William H Rodriguez
(74) *Attorney, Agent, or Firm* — Carlson, Gaskey & Olds PC

(57) ABSTRACT

A nacelle assembly includes an inlet lip section and a cowl section positioned downstream of the inlet lip section. At least a portion of the cowl section is moveable to influence an effective boundary layer thickness of the nacelle assembly.

17 Claims, 4 Drawing Sheets

U.S. PATENT DOCUMENTS

| | | | |
|---|---|---|---|
| 4,899,958 A * | 2/1990 | Horikawa | 244/53 B |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,058,617 A | 10/1991 | Stockman et al. | |
| 5,127,222 A | 7/1992 | Ream et al. | |
| 5,143,329 A | 9/1992 | Coffinberry | |
| 5,145,126 A | 9/1992 | Patilla | |
| 5,156,362 A * | 10/1992 | Leon | 244/200.1 |
| 5,177,957 A | 1/1993 | Grieb | |
| 5,261,227 A | 11/1993 | Giffin, III | |
| 5,284,012 A | 2/1994 | Laborie et al. | |
| 5,297,765 A | 3/1994 | Hughes et al. | |
| 5,351,476 A | 10/1994 | Laborie et al. | |
| 5,447,283 A | 9/1995 | Tindell | |
| 5,586,431 A | 12/1996 | Thonebe et al. | |
| 5,593,112 A | 1/1997 | Maier et al. | |
| 5,725,182 A * | 3/1998 | Valleroy | 244/110 B |
| 5,727,380 A * | 3/1998 | Lardy et al. | 60/230 |
| 5,743,488 A | 4/1998 | Rolston et al. | |
| 5,987,880 A | 11/1999 | Culbertson | |
| 6,089,505 A | 7/2000 | Gruensfelder et al. | |
| 6,109,566 A | 8/2000 | Miller et al. | |
| 6,129,311 A | 10/2000 | Welch et al. | |
| 6,170,253 B1 * | 1/2001 | Newton | 60/226.2 |
| 6,179,251 B1 | 1/2001 | Tindell et al. | |
| 6,260,567 B1 | 7/2001 | Gruensfelder et al. | |
| 6,334,753 B1 | 1/2002 | Tillman et al. | |
| 6,340,135 B1 | 1/2002 | Barton | |
| 6,360,989 B1 | 3/2002 | Maguire | |
| 6,379,110 B1 | 4/2002 | McCormick et al. | |
| 6,390,418 B1 | 5/2002 | McCormick et al. | |
| 6,651,929 B2 | 11/2003 | Dionne | |
| 6,655,632 B1 * | 12/2003 | Gupta et al. | 244/53 B |
| 6,708,711 B2 | 3/2004 | Surply et al. | |
| 6,764,043 B2 | 7/2004 | Sankrithi et al. | |
| 6,971,229 B2 | 12/2005 | Lair | |
| 7,048,229 B2 | 5/2006 | Sanders et al. | |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,617,670 B2 | 11/2009 | Truax et al. | |
| 7,870,721 B2 * | 1/2011 | Winter et al. | 60/226.1 |
| 2005/0274103 A1 * | 12/2005 | Prasad et al. | 60/226.1 |
| 2008/0267762 A1 * | 10/2008 | Jain et al. | 415/2.1 |
| 2008/0283676 A1 * | 11/2008 | Jain et al. | 244/53 B |

FOREIGN PATENT DOCUMENTS

| | | |
|---|---|---|
| GB | 1336724 | 11/1973 |
| GB | 1382809 | 2/1975 |

OTHER PUBLICATIONS

U.S. Appl. No. 11/584,030, filed Oct. 20, 2006, Morford, et al.
U.S. Appl. No. 11/595,040, filed Nov. 10, 2006, Winter, et al.
U.S. Appl. No. 11/739,216, filed Apr. 24, 2007, Jain, et al.
U.S. Appl. No. 11/750,398, filed May 18, 2007, Jain, et al.
U.S. Appl. No. 11/772,287, filed Jul. 2, 2007, Jain, et al.
U.S. Appl. No. 11/769,749, filed Jun. 28, 2007, Jain, et al.

* cited by examiner

VARIABLE GEOMETRY NACELLE ASSEMBLY FOR A GAS TURBINE ENGINE

BACKGROUND OF THE INVENTION

This invention generally relates to a gas turbine engine, and more particularly to a nacelle assembly for a turbofan gas turbine engine.

In an aircraft gas turbine engine, such as a turbofan engine, air is pressurized in a compressor and mixed with fuel in a combustor for generating hot combustion gases. The hot combustion gases flow downstream through turbine stages which extract energy from the hot combustion gases. A fan supplies air to the compressor.

Combustion gases are discharged from the turbofan engine through a core exhaust nozzle and a quantity of fan air is discharged through an annular fan exhaust nozzle defined at least partially by a nacelle assembly surrounding the core engine. A majority of propulsion thrust is provided by the pressurized fan air which is discharged through the fan exhaust nozzle, while the remaining thrust is provided from the combustion gases discharged through the core exhaust nozzle.

The fan section of the turbofan gas turbine engine may be geared to control a tip speed of the fan section. The ability to reduce the fan section tip speed results in decreased noise because the fan section tip speed is lower in speed than the speed of the rotating compressor. Also, controlling the fan section tip speed allows the fan section to be designed with a large diameter, which further decreases noise. However, the nacelle assembly of the turbofan engine must be large enough to accommodate the large diameter fan section.

It is known in the field of aircraft gas turbine engines that the performance of a turbofan engine varies during diversified conditions experienced by the aircraft. An inlet lip section located at the foremost end of the turbofan nacelle assembly is typically designed to enable operation of the turbofan engine and reduce the separation of airflow from the inlet lip section of the nacelle assembly during these diversified conditions. For example, the inlet lip section requires a "thick" inlet lip section to support operation of the engine during specific flight conditions, such as cross-wind conditions, take-off and the like. Disadvantageously, the thick inlet lip section may reduce the efficiency of the turbofan engine during normal cruise conditions of the aircraft. As a result, the maximum diameter of the nacelle assembly may be approximately 10-20% larger than required during cruise conditions.

In addition, boundary layer separation is a common problem associated with thick inlet lip sections. Boundary layer separation occurs where airflow communicated through the inlet lip section separates from the flow surface of the inlet lip section, which may cause engine stall, the loss of the capability to generate lift, and may decrease engine efficiency.

Attempts have been made to reduce the onset of boundary layer separation within the nacelle assembly. For example, small vortex generators are known which increase the velocity gradient of oncoming airflow near the effective boundary layer of the inlet lip section. In addition, synthetic jets are known which introduce an airflow at the boundary layer to increase the velocity gradient of the oncoming airflow near the boundary separation point. However, these attempts have proved complex, expensive and have not fully reduced the onset of boundary layer separation.

Accordingly, it is desirable to improve the performance of a turbofan gas turbine engine during diversified conditions to provide a nacelle assembly having a reduced thickness, reduced weight and reduced drag.

SUMMARY OF THE INVENTION

A nacelle assembly includes an inlet lip section and a cowl section positioned downstream of the inlet lip section. At least a portion of the cowl section is moveable to influence an effective boundary layer thickness on the nacelle assembly.

A gas turbine engine includes a compressor section, a combustor section, a turbine section, and a nacelle assembly which partially surrounds the compressor section, the combustor section and the turbine section. The nacelle assembly includes an inlet lip section and a cowl section positioned downstream of the inlet lip section. At least a portion of the cowl section is selectively moveable. A controller identifies an operability condition and selectively moves the cowl section in response to the operability condition to influence an effectively boundary layer thickness of the nacelle assembly.

A method of managing an effective boundary layer thickness of an inlet lip section of a nacelle of a gas turbine engine includes sensing an operability condition, and selectively moving at least a portion of a cowl section positioned adjacent to the inlet lip section in a radial outward and upstream direction relative to the nacelle.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
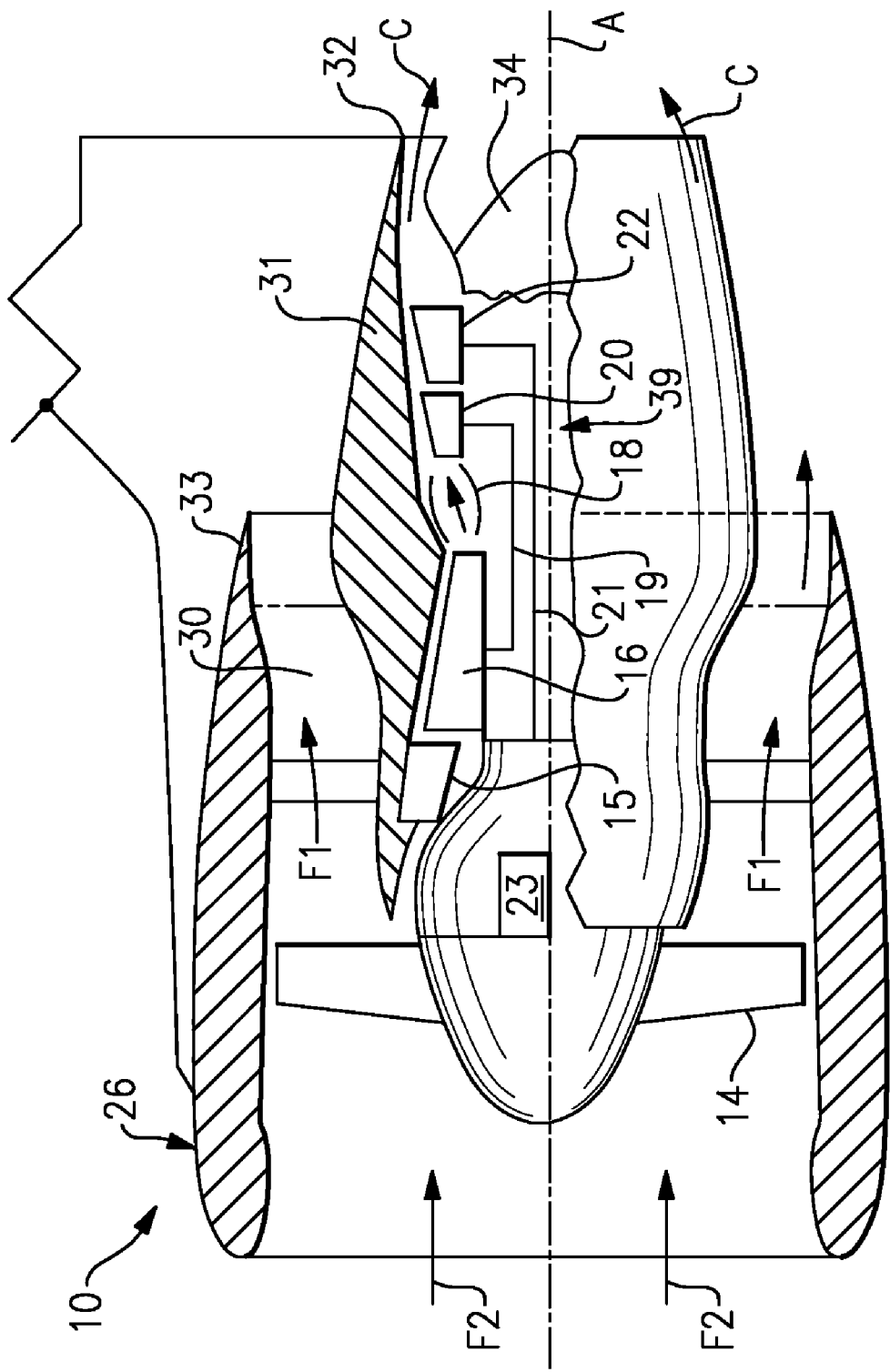
FIG. 1 illustrates a general sectional view of a gas turbine engine.

FIG. 1 illustrates a gas turbine engine 10 which includes (in serial flow communication) a fan section 14, a low pressure compressor 15, a high pressure compressor 16, a combustor 18, a high pressure turbine 20, and a low pressure turbine 22. During operation, air is pulled into the gas turbine engine 10 by a fan section 14, pressurized by the compressors 15, 16 and is mixed with fuel and burned in a combustor 18. Hot combustion gases generated within the combustor 18 flow through the high and low pressure turbines 20, 22, which extract energy from the hot combustion gases.

In a two-spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the low pressure compressor 15 and the fan section 14 through a low speed shaft 21. However, the invention is not limited to the two spool gas turbine architecture described and may be used with other architectures such as a single spool axial design, a three spool axial design and other architectures. That is, the present invention is applicable to any gas turbine engine, and to any application.

The example gas turbine engine 10 is in the form of a high bypass ratio turbofan engine mounted within a nacelle assembly 26, in which a significant amount of air pressurized by the fan section 14 bypasses the core engine 39 for the generation of propulsion thrust. The nacelle assembly 26 partially surrounds an engine casing 31, which houses the core engine 39. The airflow entering the fan section 14 may bypass the core engine 39 via a fan bypass passage 30 which extends between the nacelle assembly 26 and the engine casing 31 for receiving and communicating a discharge airflow F1. The high bypass flow arrangement provides a significant amount of thrust for powering an aircraft.

The engine 10 may include a gear train 23 which reduces the speed of the rotating fan section 14. The gear train 23 can be any known gear system, such as a planetary gear system with orbiting planet gears, a planetary system with non-orbiting planet gears, or other type of gear system. In the disclosed example, the gear train 23 has a constant gear ratio. It should be understood, however, that the above parameters are only exemplary of a contemplated geared turbofan engine 10. That is, the invention is applicable to traditional turbofan engines as well as other engine architectures.

The discharge airflow F1 is discharged from the engine 10 through a fan exhaust nozzle 33. Core exhaust gases C are discharged from the core engine 39 through a core exhaust nozzle 32 defined between the engine casing 31 and a center plug 34 disposed coaxially around a longitudinal centerline axis A of the gas turbine engine 10.

Figure 2:
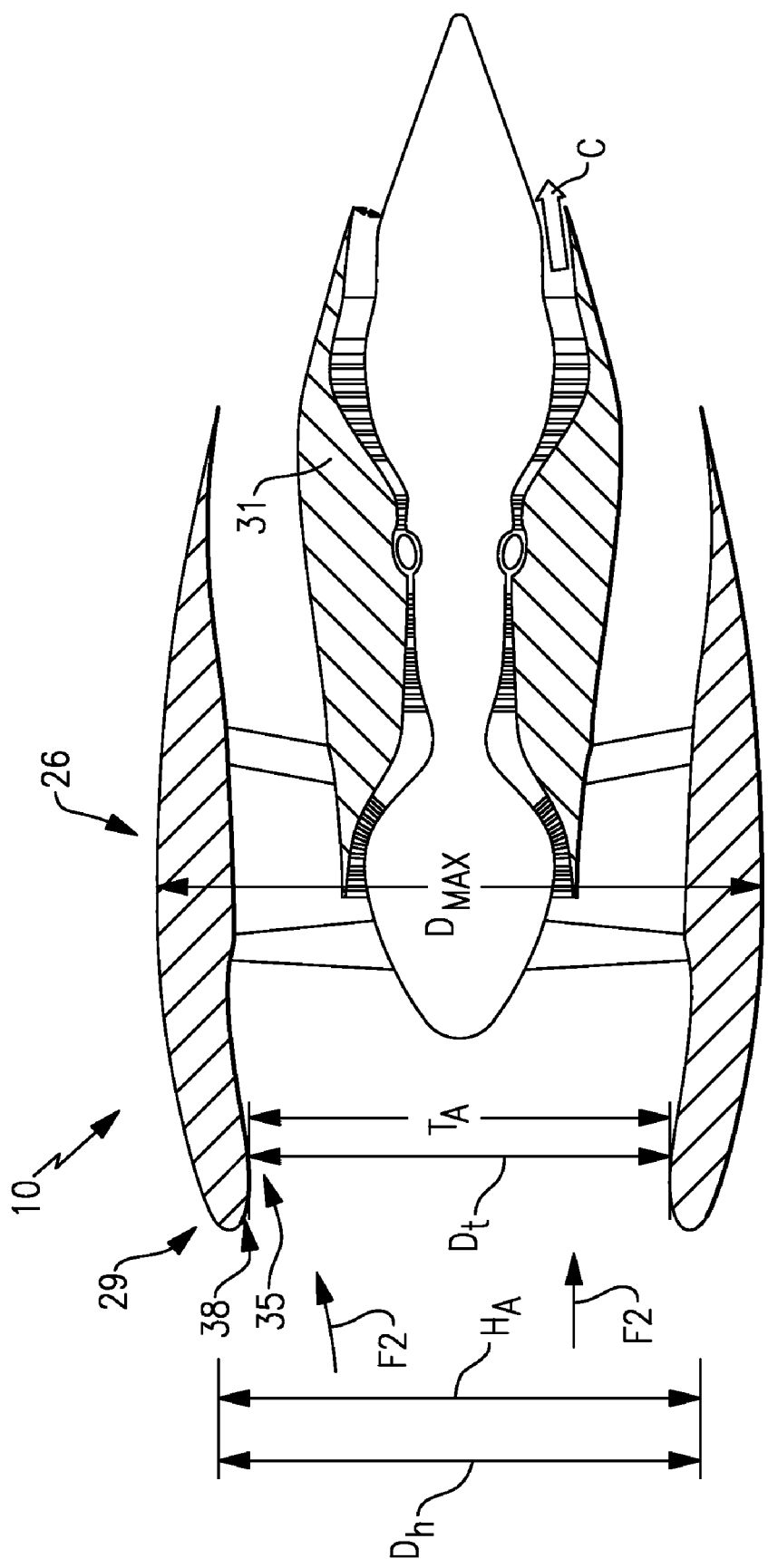
FIG. 2 illustrates a nacelle assembly of the gas turbine engine illustrated in FIG. 1.

FIG. 2 illustrates an example inlet lip section 38 of the nacelle assembly 26. The inlet lip section 38 is positioned near a forward segment 29 of the nacelle assembly 26. A boundary layer 35 is associated with the inlet lip section 38. The boundary layer 35 represents an area adjacent to a flow surface of the inlet lip section 38 at which the velocity gradient of airflow is zero. That is, the velocity profile of oncoming airflow F2 goes from a free stream away from the boundary layer 35 to near zero at the boundary layer 35 due to the friction forces that occur as the oncoming airflow F2 passes over the outer flow surface of the inlet lip section 38.

The nacelle assembly 26 defines a contraction ratio. The contraction ratio represents a relative thickness of the inlet lip section 38 of the nacelle assembly 26 and is represented by the ratio of a highlight area $H_A$ (ring shaped area defined by a highlight diameter $D_h$) and a throat area $T_a$ (ring shaped area defined by throat diameter $D_T$ of the nacelle assembly 26. Current industry standards typically use a contraction ratio of approximately 1.300 to prevent the separation of the oncoming airflow F2 from the inlet lip section 38 during engine operation, but other contraction ratios may be feasible. "Thick" inlet lip section designs, which are associated with large contraction ratios, increase the maximum diameter $D_{max}$ and increase weight and drag penalties associated with the nacelle assembly 26.

Increasing the relative thickness of the boundary layer 35 of the inlet lip section 38 during specific flight conditions slows and redirects the flow of oncoming airflow F2 around the inlet lip section 38, thereby simulating a "thick" inlet lip section 38 and enabling the nacelle assembly 26 to be designed with a reduced contraction ratio. In one example, the increased boundary layer 35 thickness is achieved by providing a nacelle assembly having a variable geometry that is operable to simulate a "thick" inlet lip section 38 during specific flight conditions, as is further disclosed below.

Figure 3:
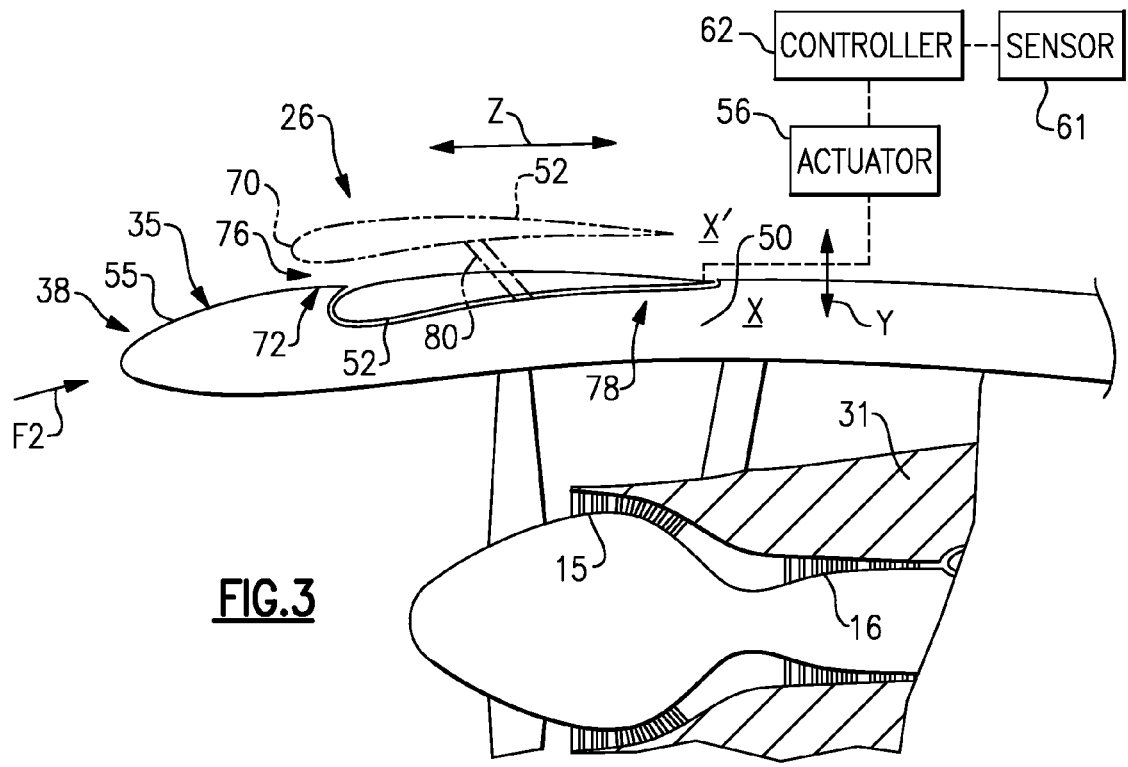
FIG. 3 illustrates a moveable cowl section of the nacelle assembly of the gas turbine engine shown in FIG. 1.

FIG. 3 illustrates an example cowl section 50 of the nacelle assembly 26 of the gas turbine engine 10. The cowl section 50 is positioned downstream from the inlet lip section toward the central portion of the nacelle assembly 26. The cowl section 50 includes a moveable portion 52 which is selectively introduced at the boundary layer 35 of the inlet lip section 38. The moveable portion 52 is introduced at an exterior wall 55 of the nacelle assembly 26, for example. It should be understood that any portion of the cowl section 50 may be movable and may be selectively introduced anywhere along the nacelle assembly 26.

Figure 4:
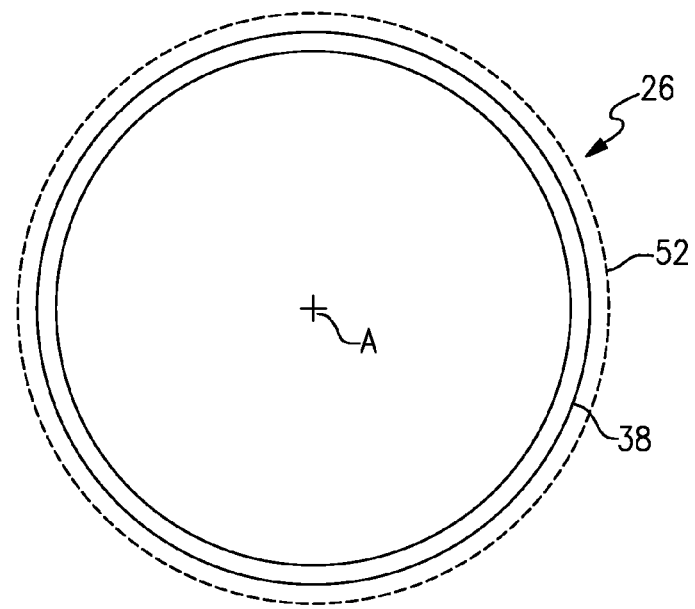
FIG. 4 illustrates a front view of the nacelle assembly.

The increased thickness of the boundary layer 35 is achieved by translating the moveable portion 52 of the cowl section 50 adjacent to the boundary layer 35 of the inlet lip section 38 in response to a detected operability condition. While a single moveable portion 52 of the cowl section 50 is illustrated, it should be understood that the moveable portion 52 could circumferentially extend about the entire nacelle assembly 26 such that the "thick" lip function occurs around the entire circumference of the inlet lip section 38 (see FIG. 4). The moveable portion 52 may be comprised of multiple, arc segments distributed about the circumference. In another example, the cowl section 50 could include a plurality of sections positioned circumferentially about the nacelle assembly 26, with each section having a moveable portion used to simulate the "thick" inlet lip section 38. In addition, it should be understood that the cowl section 50 is not illustrated to the scale it would be in practice. In fact, the cowl section 50 is shown larger than in practice to better illustrate its function.

A sensor 61 detects the operability condition and communicates with a controller 62 to translate the moveable portion 52 of the cowl section 50 in a radial outward direction Y and an upstream direction Z relative to the nacelle assembly 26. Of course, this view is highly schematic. In addition, the illustrations of the movement of the moveable portion 52 in the directions Y and Z are shown exaggerated to better illustrate the function of the moveable portion 52. A person of ordinary skill in the art would understand the distances the moveable portion 52 should be displaced in the directions Y and Z in response to sensing the operability condition. It should be understood that the sensor 61 and the controller 62 may be programmable to detect any known operability condition of the aircraft. Also, the sensor 61 can be replaced by any control associated with the gas turbine engine 10 or an associated aircraft. In fact, the controller 62 itself can generate the signal to translate the moveable portion 52 of the cowl section 50.

The moveable portion 52 is selectively moveable between a first position X (i.e., a stored position, represented by solid lines) and a second position X' (represented by phantom lines) via an actuator assembly 56 in response to detecting an operability condition of a gas turbine engine 10, for example. A person of ordinary skill in the art having the benefit of this disclosure would be able to implement an appropriate actuator assembly 56 to translate the moveable portion 52, including but not limited to pneumatic, hydraulic and electromagnetic actuator assemblies. In another example, the movable portion 52 is moveable to any position between the first position X and the second position X'. The second position X' is radially outward and upstream from the first position X, for example. It should be understood that the actual distances the moveable portion 52 of the cowl section 50 is translated in the radial outward and upstream directions will vary depending upon design specific parameters including but not limited to the operability conditions experienced by the aircraft.

Figure 5:
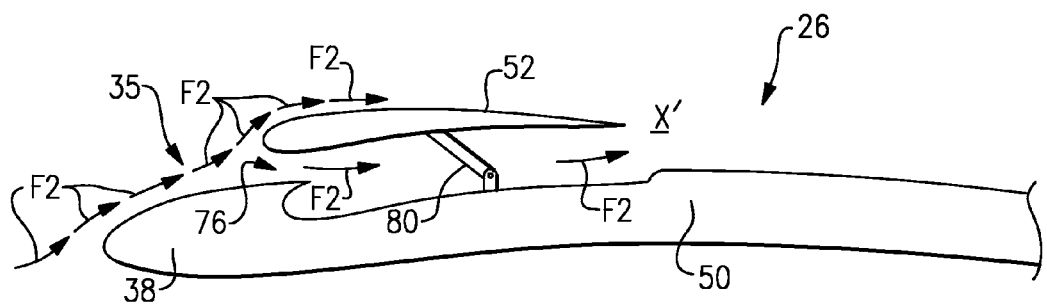
FIG. 5 illustrates a schematic view of a "thick" inlet lip section simulation.

The oncoming airflow F2 is forced to flow around the moveable portion 52 of the cowl section 50 in response to translating the moveable portion 52 to the second position X', thereby simulating a thick inlet lip section 38 as required during certain operability conditions (see FIG. 5). In one example, the operability condition includes a take-off condition. In another example, the operability condition includes a climb condition. In yet another example, the operability condition includes a crosswind condition. Crosswind conditions are experienced during takeoff as an aircraft travels down a runway (i.e., where the aircraft experiences airflow in a roughly perpendicular direction with respect to the movement of the aircraft down the runway). In still another example, the operability condition includes a windmilling condition. A windmilling condition occurs where an engine of a multi-engine aircraft looses functionality or is otherwise shut down (i.e., an engine out condition). The shut down engine is advantageously permitted to rotate, and is driven by an airflow resulting from the forward velocity of the aircraft (i.e., the damaged engine is permitted to windmill). It should be understood that the moveable portion 52 of the cowl section 50 may be moved to the second position X', or to any intermediate position, in response to any operability condition experienced by the aircraft.

Where positioned at the second position X', for example, a leading edge 70 (FIG. 3) of the moveable portion 52 of the cowl section 50 is positioned adjacent to a trailing edge 72 of the inlet lip section 38. A gap 76 extends between the moveable portion 52 and the inlet lip section 38 at the second position X'. The gap 76 controls a flow stagnation point of the cowl section 50 and is appropriately sized to avoid flow separation. The flow stagnation point occurs where the velocity gradient of the oncoming airflow F2 is reduced to zero and reverses directions. A worker of ordinary skill in the art having the benefit of this disclosure would be able to design the nacelle assembly 26 to control the stagnation point where the moveable portion 52 of the cowl section 50 is positioned at the second position X'.

Figure 6:
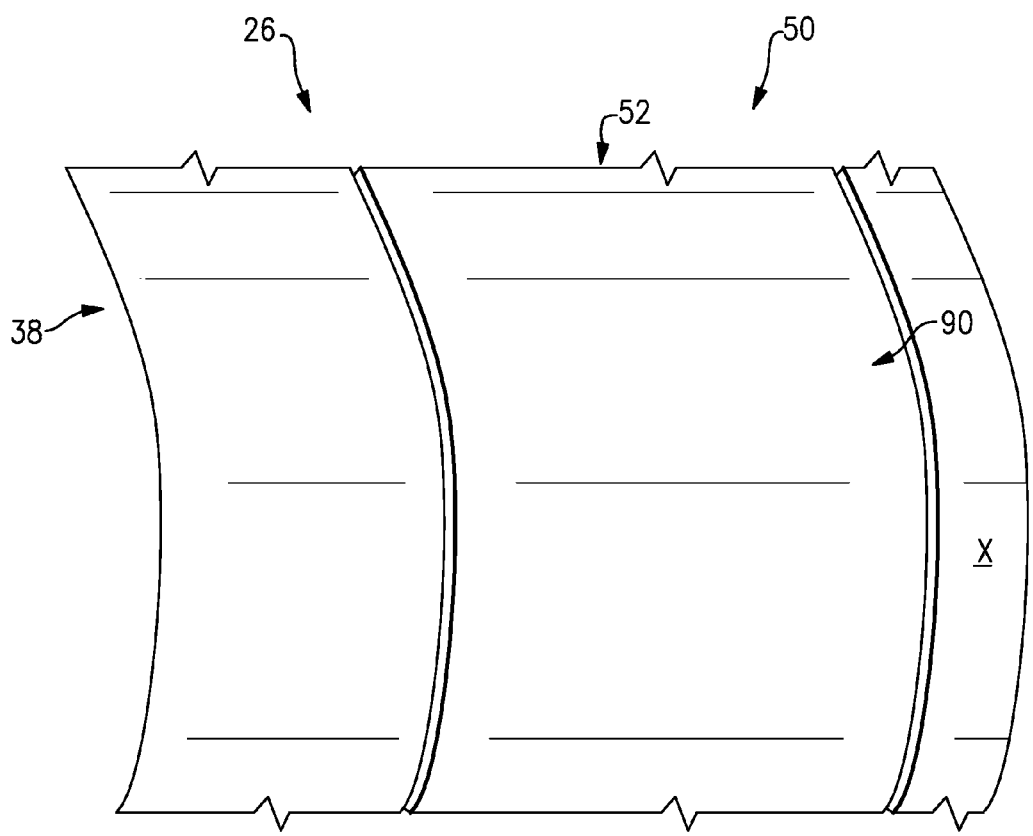
FIG. 6 illustrates another view of the cowl section of the nacelle assembly.

During normal cruise operation (e.g., a generally constant speed at generally constant, elevated altitude), the moveable portion 52 is returned to the first position X of the nacelle assembly 26. In the stored position, an outer surface 90 of the moveable portion 52 is approximately flush with the outer flow surface of the nacelle assembly 26 (See FIG. 6). The flush surfaces therefore do not disrupt or redirect the oncoming airflow F2 where stored in the position X.

In addition, the cowl section 50 includes a cavity 78. The moveable portion 52 is positioned within the cavity 78 in the stored position (i.e., the first position X). A linkage 80 is mounted to the moveable portion 52. The linkage 80 is deployed by the actuator assembly 56 by pivoting, toggling, and/or extending the linkage 80 to move the moveable portion 52 between the first position X and the second position X', or to any other position. In the first position X, the linkage 80 is folded and stored within the cavity 78.

By simulating a "thick" inlet lip section 38 during specific flight conditions, the aircraft may be designed having a thin inlet lip section 38 (i.e., a slim line nacelle having a reduced contraction ratio is achieved). Therefore, efficiency is improved during normal cruise operations. Further, by increasing the boundary layer 35 thickness during diverse operability conditions, performance of the gas turbine engine 10 is improved during each specific operability condition. As a result, the nacelle assembly 26 is designed for specific cruise conditions of the aircraft. A reduced maximum diameter of the nacelle assembly 26 may therefore be achieved while reducing weight, reducing fuel burn and increasing the overall efficiency of the gas turbine engine 10.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A nacelle assembly, comprising:
    an inlet lip section; and
    a cowl section downstream of said inlet lip section, wherein at least a portion of said cowl section is selectively moveable between a first position and a second position to influence an effective boundary layer thickness of the nacelle assembly, wherein said second position is radially outward from an exterior wall of the nacelle assembly, and wherein a leading edge of said portion of said cowl section is positioned radially outward from and adjacent to a trailing edge of said inlet lip section in said second position.

2. The assembly as recited in claim 1, wherein said second position is radially outward and upstream relative to said first position.

3. The assembly as recited in claim 1, comprising a gap between said inlet lip section and said at least a portion of said cowl section when said at least a portion of said cowl section is positioned at said second position.

4. The assembly as recited in claim 1, wherein an exterior surface of said at least a portion of said cowl section is approximately flush with an exterior surface of said nacelle assembly in said first position.

5. The assembly as recited in claim 1, wherein said cowl section extends circumferentially about said nacelle assembly.

6. The assembly as recited in claim 1, comprising a linkage mounted to said at least a portion of said cowl section.

7. A gas turbine engine, comprising:
    at least one compressor section, at least one combustor section and at least one turbine section;
    a nacelle assembly at least partially surrounding said at least one compressor section, said at least one combustor section and said at least one turbine section, wherein said nacelle assembly includes an inlet lip section and a cowl section downstream from said inlet lip section, at least a portion of said cowl section moveable between a stored position and an actuated position to influence an effective boundary layer thickness of said nacelle assembly, wherein said actuated position is radially outward from an exterior wall of said nacelle assembly;
    an electronic controller that identifies an operability condition, wherein said controller selectively moves said at least a portion of said cowl section between said stored position and said actuated position in response to said operability condition;
    a sensor that produces a signal representing said operability condition and communicates said signal to said controller; and
    an actuator assembly in communication with said controller to move said at least a portion of said cowl section in response to detecting said operability condition.

8. The gas turbine engine as recited in claim 7, comprising a linkage arm attached to said at least a portion of said cowl section.

9. The gas turbine engine as recited in claim 7, wherein said at least a portion of said cowl section is moved radially outward and upstream relative to said nacelle assembly when moved between said stored position and said actuated position.

10. The gas turbine engine as recited in claim 7, wherein an exterior surface of said at least a portion of said cowl section is approximately flush with an exterior surface of said nacelle assembly in said stored position.

11. The gas turbine engine as recited in claim 7, wherein said cowl section extends circumferentially about said nacelle assembly.

12. The gas turbine engine as recited in claim 7, comprising a fan section and a gear train that selectively controls a speed of said fan section.

13. A method of managing an effective boundary layer thickness of an inlet lip section of a nacelle of a gas turbine engine, comprising:
  (a) sensing an operability condition with a sensor; and
  (b) selectively positioning a portion of a cowl section of the nacelle adjacent to the inlet lip section in a radial outward and upstream direction relative to an exterior wall of the nacelle in response to the step of sensing the operability condition with the sensor.

14. The method as recited in claim 13, wherein said step (b) comprises:
  moving the portion of the cowl section between a first position and a second position, wherein the second position is radially outward and upstream relative to the first position.

15. The method as recited in claim 14, comprising the step of:
  (c) returning the portion of the cowl section to the first position in response to sensing a cruise condition.

16. The method as recited in claim 14, comprising the step of:
  positioning a leading edge of the portion of the cowl section adjacent to a trailing edge of the inlet lip section when the portion of the cowl section is moved to the second position.

17. The method as recited in claim 16, wherein the step of positioning the leading edge of the portion of the cowl section adjacent to the trailing edge of the inlet lip section includes maintaining a gap between the leading edge and the trailing edge.

\* \* \* \* \*